United States Patent [19]

Riley

[11] Patent Number: 4,835,654

[45] Date of Patent: May 30, 1989

[54] RATED TEMPERATURE PROTECTION FOR TURBINE ENGINE

[75] Inventor: Paul H. Riley, Derby, England

[73] Assignee: Rolls-Royce PLC, London, England

[21] Appl. No.: 94,025

[22] Filed: Sep. 4, 1987

Related U.S. Application Data

[63] Continuation of Ser. No. 900,696, Aug. 27, 1986, abandoned.

[30] Foreign Application Priority Data

Oct. 30, 1985 [GB] United Kingdom ................. 8526725

[51] Int. Cl.$^4$ .............................................. H02H 5/04
[52] U.S. Cl. ........................................ 361/103; 361/25
[58] Field of Search ................................ 361/23–25, 361/34–56, 103, 104, 31, 77

[56] References Cited

U.S. PATENT DOCUMENTS

| | | | |
|---|---|---|---|
| 3,959,713 | 5/1976 | Davis et al. | 361/103 X |
| 4,021,701 | 5/1977 | Davies | 361/103 X |
| 4,041,540 | 8/1977 | Kampf et al. | 361/31 X |
| 4,152,636 | 5/1979 | Gorden | 361/20 X |
| 4,195,254 | 3/1980 | Gurwicz et al. | 361/24 X |
| 4,200,829 | 4/1980 | Pohl | 361/25 X |
| 4,333,119 | 6/1982 | Schoenmeyr | 361/77 X |
| 4,345,218 | 8/1982 | Congdon | 361/103 X |
| 4,355,344 | 10/1982 | Felici et al. | 361/103 |
| 4,467,386 | 8/1984 | Wasson | 361/103 X |
| 4,542,324 | 9/1985 | Leuthen | 361/25 X |
| 4,547,826 | 10/1985 | Premerlani | 361/103 X |
| 4,675,777 | 6/1987 | Watrous | 361/103 X |

Primary Examiner—A. D. Pellinen
Assistant Examiner—A. Jonathan Wysocki
Attorney, Agent, or Firm—Cushman, Darby & Cushman

[57] ABSTRACT

A control system for a gas turbine engine guards the engine against destructive overspeed resulting from failure of electronic components in the system due to overheating. A main electronic (preferably digital) controller is normally in control of fuel flow to the engine by means of a flow metering unit. In addition, an electronic overspeed limiter guards against overspeed at normal system temperatures, should the main controller fail, by overriding the action of the main controller on the flow metering unit. A failsafe unit is responsive to the temperature of the control system, and comprises components rated at a substantially higher peak operating temperature than the components used in the other units. The failsafe unit acts as an ultra-reliable switch operative to depower the main controller, and, optionally, the overspeed limiter, when the temperature of the control system exceeds a predetermined value above which components in the two latter units are likely to fail. Consequent upon this depowering, the fuel flow metering unit is automatically set to a low fuel flow rate at which overspeed of the engine is impossible for all conditions of the engine.

8 Claims, 1 Drawing Sheet

RATED TEMPERATURE PROTECTION FOR TURBINE ENGINE

This is a continuation of application Ser. No. 900,696, filed Aug. 27, 1986, which was abandoned upon the filing hereof.

BACKGROUND OF THE INVENTION

This invention relates to means for ensuring that in the event of overheating caused, for example, by fire, an electronic control system for a gas turbine engine will fail in a way which safeguards the mechanical integrity of the engine.

In the unlikely event of a fire in or near a gas turbine engine, causing overheating of an electronic control system of the engine, it is important that the control system should fail in a safe, predictable way. For example, a failure which caused the control system to allow a significantly higher fuel flow rate to the engine than it actually required could lead to a catastrophic overspeed of the engine. Such an event is of particular concern in the case of an engine fitted with a FADEC (Full Authority Digital Electronic Control) system, where the integrity of the engine is totally dependent on the control system, so it is even more important that the system fails in a safe manner.

It is conventional to tackle this problem by simply arranging the system such that if overheating occurs, the control system is disconnected from its power supply, thereby shutting off the valves in the fuel flow regulator so that the engine is starved of fuel and runs down. In the past, the means of achieving the disconnection have been essentially mechanical in nature, such as bimetallic strips or fusible wires. Such means are becoming unsatisfactory because compared with other items of modern gas turbine technology, they have an unacceptably high failure rate in excess of three per million hours during normal engine running conditions. They also do not have very good temperature sensing accuracy characteristics.

SUMMARY OF THE INVENTION

The present invention contributes to the solution of the above problem by using one set of electronic components to protect engines against the effect of failure of other electronic components in the engine control system.

According to the present invention, a control system for a gas turbine engine includes first and second electronic control means and temperature sensor means. The first electronic control means includes components having a first (lower) peak operating temperature. The temperature sensor means generates a sensed temperature signal representing the temperature of the control system. The second electronic control means is responsive to the sensed temperature signal and includes components having a second (higher) peak temperature than that of the components of the first electronic control means. The arrangement is such that the second electronic control means is operative to remove control of the engine from the first electronic control means when the sensed temperature signal exceeds a predetermined value indicative that components in the first electronic control means are likely to fail.

Preferably the second electronic control means comprises electronic switch means which is preferably coupled to power supply means for supplying power to the first electronic control means, whereby when the sensed temperature signal exceeds the predetermined value the elctronic switch means operates to depower the first electronic control means.

As only a small number of the highly rated components are required to produce a temperature responsive electronic switch, its reliability at normal operating temperatures is very high. Its accuracy of indication of overheating is also much greater than its mechanical counterparts.

Preferably the electronic switch means comprises: temperature datum means for generating a datum temperature signal expressive of the predetermined value of the sensed temperature signal; comparator means for comparing the sensed temperature signal with the datum temperature signal and outputting a switching signal when the sensed temperature signal equals or exceeds the datum temperature signal; and a semiconductor switching device for effecting the required switching action in response to the switching signal.

A single electronic switch means may be coupled to the power supply means for supplying a single critical electronic control unit, or a plurality of electronic control units or the complete control system, as required for safe rundown of the engine.

BRIEF DESCRIPTION OF THE DRAWINGS

An embodiment of the invention will now be described, by way of example only, with reference to the accompanying drawings, in which.

DETAILED DESCRIPTION OF THE PREFERRED EMBODIMENT

Figure 1:
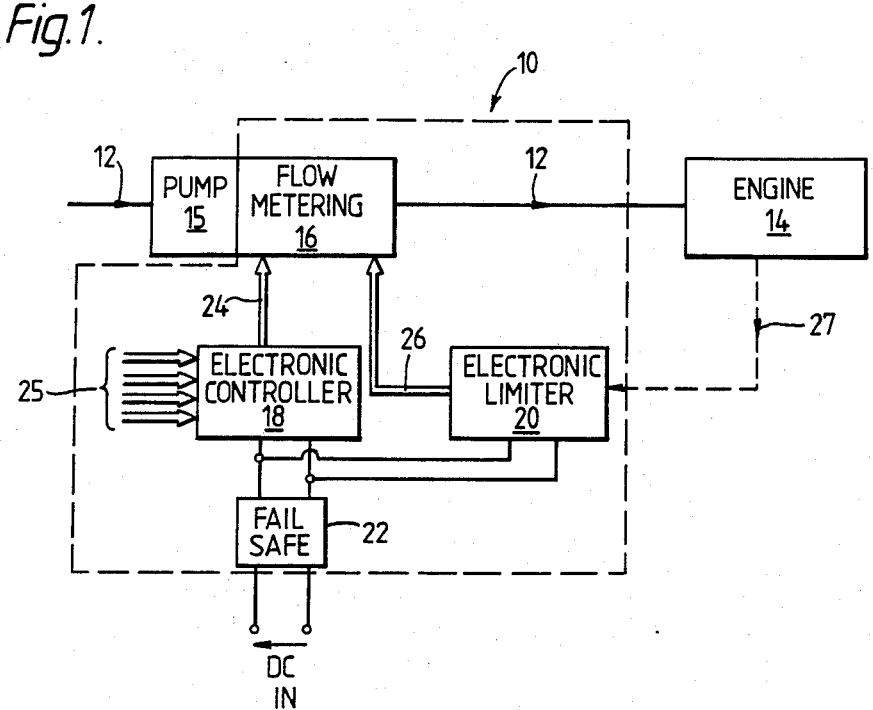
FIG. 1 is a block diagram illustrating the general principle of operation of the invention.

Referring to FIG. 1, a control system 10, for controlling fuel flow 12 to a gas turbine aeroengine 14, comprises various interconnected modules of which only a mechanical fuel pump 15 with electro-mechanical fuel flow metering unit 16, a main engine electronic control unit 18, and an engine overspeed limiter unit 20, also electronic, are shown for the sake of simplicity. Control unit 18 may be digital in operation. In addition, and in accordance with the invention, the control system 10 also incorporates a temperature responsive electronic failsafe unit 22 which is coupled across the DC power input to the electronic units 18 and 20, the unit 22 in this case being an electronic switch whoxe purpose is to cut off the power to the electronic units 18 and 20 if they become overheated and therefore liable to malfunctions whcih would lead to dangerous overspeeding of the engine. Although not indicated on the drawing, the control system 10 is, of course, located on or adjacent the outer casings of engine 14.

Apart from the provision of switch 22 according to the invention, the other units of the control system are conventional in construction and operation and will therefore not be described in detail. The fuel pump 5 pumps fuel 12 to engine 14 at a rate which is scheduled by input 24 to the fuel flow metering unit 16 from the electronic control unit 18 in accordance with inputs 25 from various pressure and temperature sensors (not shown) on the engine 14 and from a throttle (not shown) which is under the control of the pilot of the aeroplane in which engine 14 is installed. In addition, the flow rate which the electronic control unit 18 would otherwise schedule for the fuel flow metering unit 16 is limited by an input 26 from the engine overspeed limiter unit 20 which receives an engine shaft speed signal 27, limiter signal 26 serving to ensure that the fuel flow rate is such as to keep shaft speed down to optimum safe values if the electronic control unit 18 should fail. The fuel flow regulator 16 includes variable flow valves which are actuated by inputs 24 and 26. If these inputs should cease, the valves automatically close for safety. This closure is not complete; the valves are in fact sprung against stops which leave them open sufficiently to maintain the fuel flow rate at a value which maintains a pilot flame in the combustion chamber.

The electronic control units 18, 20 are constructed from electronic components which are rated at a peak operating temperature of 125° C. This is the normal rating for electronic components for use in aircraft systems. However, the temperature responsive electronic switch 22 is constructed from electronic components which have a peak operating temperature of 200° C., much higher than the normally rated components.

Figure 2:
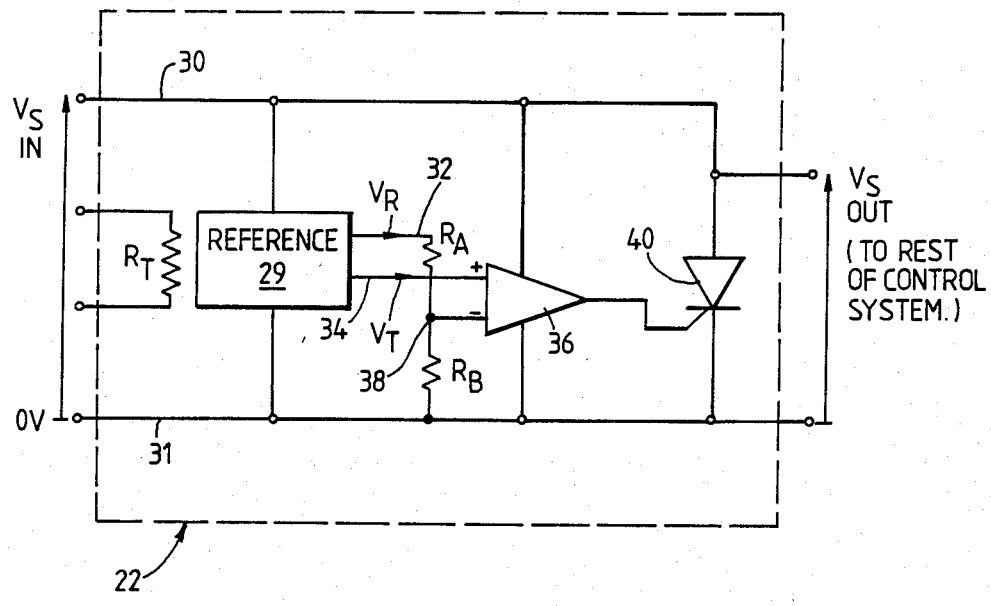
FIG. 2 is a circuit diagram of a specific circuit configuration for putting the invention into practice.

As will be shown in connection with FIG. 2, only a small number of highly-rated components are required in the construction of switch 22. Consequently, the reliability of switch 22 at normal operation temperatures of the engine is very high, of the order of 0.4 failures per million hours, much better than the failure rate quoted earlier for the mechanical components which are conventionally used to depower systems. Further, the accuracy of response to an overheat in terms of switching temperature is 4 to 5 times better than mechanical components.

It is of course important that the switch 22 should be constructed from components capable of reliable operation at high temperatures, not only from the point of view of reliability at normal operating temperatures, but also from the point of view of reliable functioning at temperatures in excess of normal operating temperatures, so that the switch can perform its function of depowering the electronic control units in the event of overheating. The switch 22 is of course set to depower units 18 and 20 when the operating temperature sensed by switch 22 reaches a predetermined value just below the peak operating temperature of the normally rated electronic components.

To take the example of a specific failure mode, suppose that overheating occurs and as a result over-speed limiter 20 gives a signal 26 which allows a significantly higher fuel flow than is needed by the engine in its current condition. Unless the electronic control units are depowered by switch 22, it will be seen that there is a danger that fuel flow metering unit 16 will allow the fuel pump 15 to overfuel engine 14, causing a catastrophic surge or overspeed of a compressor or turbine of the engine 14. However, when switch 22 detects the overheat, it depowers the electronic control units 18, 20 so that inputs 24 and 26 to the fuel flow metering unit 16 are zero. The fuel flow metering unit 16 therefore substantially cuts off the fuel supply 12 and the engine 14 then runs down without suffering surge or overspeed. Alternatively, it could be arranged that the fuel flow metering unit 16 would maintain fuel flow at a lower safe value which would avoid overspeeding of the engine under any conditions but which would still provide useful engine power.

In FIG. 1, the temperature responsive electronic switch 22 is coupled to the power input to both electronic units 18 and 20. However, it would also be possible to couple switch 22 to the power input of only the electronic control unit 18, and similarly achieve fuel shut-off as appropriate.

Note that a system as described above could also incorporate a back-up hydromechanical control mechanism for the fuel flow metering unit to allow the pilot more or less limited manual control of the fuel flow to the engine. Note further that the failsafe unit 22 could comprise more than an electronic switch to depower control units 18 and 20; besides performing this function it could also switch in an electronic back-up unit rated to a higher peak operating temperature to maintain electronic control of the engine for longer. The back-up unit would be linked to a further very highly rated temperature-responsive and/or engine speed responsive switch which would be set to depower the electronic back-up unit and hence cut the fuel flow if the safe operating temperature of the back-up unit, or the safe operating speed of the engine, were exceeded.

Referring now to FIG. 2, the switch 22 of FIG. 1 may comprise the components shown within the envelope of dashed lines, through other combinations and configurations of components are possible, and the arrangement of FIG. 2 is therefore purely exemplary. The switch 22 as a whole is connected across the DC power input lines 30 and 31, the components being in parallel with each other, strung between lines 30 and 31.

The switch 22 includes a reference voltage device 29 which is connected across the DC supply voltage input $V_s$ on lines 30 and 31 and produces its outputs on lines 32 and 34, these being respectively a reference voltage $V_R$ and a voltage $V_T$ which varies in accordance with the temperature experienced by the device. The reference voltage $V_R$ on line 32 is coupled to the common line 31 through two resistors $R_A$ and $R_B$.

An operational amplifier 36 is also powered from the supply voltage, and as indicated, its inverting and non-inverting inputs are connected so that it acts as a comparator of the voltage $V_T$ on line 34 with the voltage at the point 38 between the two resistors $R_A$ and $R_B$. The values of $R_A$ and $R_B$ are chosen so that point 38 is at the same voltage as $V_T$ is when the temperature being experienced by device 29 is slightly less (say by 2° to 5° K.) than the peak operational temperature of 398° K. (125° C.) for the components in the rest of the control system. The output of operational amplifier 36 is connected to the gate of a thyristor 40 which is connected for power across the power supply in parallel with reference device 29 and operational amplifier 36. The thyristor 40 will not conduct until a current pulse from the operational amplifier output flows in the gate circuit, and there will be no current pulse from the operational amplifier unless $V_T$ climbs above the value of the reference voltage at point 38. However, once the thyristor has been triggered, it will of course continue to conduct until the current through it falls below its threshold level. Hence, as soon as the thyristor is triggered, it short circuits the power to the electronic control modules, and the power supply stays short-circuited in this way for as long as $V_S$ is present on lines 30 and 31.

Suitable proprietary components for constructing switch 22 are readily available. For example, reference voltage device 29 may be an integrated circuit known as REFO2 produced by Precision Monolithics Incoporated of Santa Clara, Calif., U.S.A. This component can cope with supply voltages of between 7 and 40 volts. It gives a stabilised reference voltage output $V_R$ of 5 volts and an output $V_T$ which varies linearly with absolute temperature. It will operate reliably at temperatures of up to 230° C. in the circuit shown.

A suitable operational amplifier 36 is produced by Harris Corporation of Melbourne, Fla. under the designation HA 2600. It has a maximum rating of 200° C., but will operate reliably to 230° in this circuit.

Almost any thyristor 40 of the required current rating will do to complete the switch 22.

The switch 22 can be tested for correct functioning by applying current to a heating resistor $R_T$ which is physically close to the temperature sensing element in device 29. Because the object is to get the thyristor 40 to switch on, thereby disabling the control system, the test should be performed just before engine shut down.

Although the exemplary switch 22 of FIG. 2 is constructed so that if an overheat occurs, the power supply to the rest of the electronic control system is short-circuited, it is also within the ambit of the invention to construct an electronic switch which would cut off the power supply by producing an open circuit. As a further alternative, a switch could be constructed to send a signal to another component which would then initiate a safety condition.

Such switches as that shown in FIG. 2 or those mentioned immediately above can be set to trip or trigger at a wide range of temperatures to suit the particular circumstances of each case.

Note that these switches can be encapsulated in one of the standard electronic packages, or custom manufactured intergrally with an existing hybrid circuit or similar module. They can therefore be cheap, reliable, and compatible with existing manufacturing techniques.

I claim:

1. A control system of a gas turbine engine, comprising:

first electronic control means for controlling said engine, said first electronic control means including electronic components rated at a first peak operating temperature; and second electronic control means constructed solely from electronic components with a rating of at least a second peak operating temperature higher than said first peak operating temperature, said second electronic control means comprising temperature sensor means for generating a sensed temperature signal indicative of the temperature of said control system, and further components responsive to said sensed temperature signal for removing control of said gas turbine engine from the first electronic control means when the sensed temperature signal exceeds a predetermined value indicative that components in the first electronic control means are likely to fail, said predetermined value corresponding to a predetermined temperature which is slightly less than said first peak operating temperature.

2. A control system according to claim 1 in which the second electronic control means comprises an electronic switch.

3. A control system according to claim 2 in which the electronic switch is coupled to power supply means for supplying power to the first electronic control means, whereby when the sensed temperature exceeds said predetermined value the electronic switch operates to depower the first electronic control means.

4. A control system according to claim 2 in which the electronic switch comprises: temperature datum means for generating a datum temperature signal representing said predetermined value of the sensed temperature signal, comparator means for comparing the sensed temperature signal with the datum temperature signal and outputting a switching signal when the sensed temperature signal equals or exceeds the datum temperature signal; and a semiconductor switching device for effecting the required switching action in response to the switching signal.

5. A control system according to claim 1 in which the first electronic control means comprises at least one electronic control unit.

6. A control system according to claim 1 in which the first electronic control means forms at least a part of a main engine control unit and an engine overspeed limiter unit.

7. A control system according to claim 1 in which said predetermined temperature is approximately 5° K. less than said first peak operating temperature.

8. A control system of a gas turbine engine, comprising:

first electronic control means for controlling said engine, said first electronic means including electronic components rated at a first peak operating temperature;

power supply means for supplying power to said first electronic control means; and second electronic control means constructed solely from electronic components with a rating of at least a second peak operating temperature higher than said first peak operating temperature, said second electronic control means comprising temperature sensor means for generating a sensed temperature signal indicative of the temperature of said control system, and an electronic switch, responsive to said sensed temperature signal and coupled to said power supply, said electronic switch maintaining said first electronic control means in a depowered state as long as said power supply is supplying power and said sensed temperature signal exceeds a predetermined value indicative that components in the first electronic control means are likely to fail, said predetermined value corresponding to a predetermined temperature which is slightly less than said peak operating temperature.

* * * * *